US008955571B2

(12) United States Patent
Kohnen et al.

(10) Patent No.: US 8,955,571 B2
(45) Date of Patent: Feb. 17, 2015

(54) APPARATUS FOR SUPPORTING AND HOLDING A BEAD CORE-APEX SUBASSEMBLY AND METHOD OF PRODUCING AND TRANSPORTING THE BEAD CORE-APEX SUBASSEMBLY

(71) Applicant: The Goodyear Tire & Rubber Company, Akron, OH (US)

(72) Inventors: Daniel Kohnen, Burg-Reuland (BE); Patrice De Monte, Arlon (BE); Erich Nicolaus Lemaire, Marnach (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 13/711,932

(22) Filed: Dec. 12, 2012

(65) Prior Publication Data

US 2014/0161584 A1    Jun. 12, 2014

(51) Int. Cl.
*B29D 30/48*   (2006.01)
*B60C 15/04*   (2006.01)
(Continued)

(52) U.S. Cl.
CPC ............... *B29D 30/48* (2013.01); *B60C 15/04* (2013.01); *B29D 2030/487* (2013.01); *B29D 30/0016* (2013.01); *B29D 30/2607* (2013.01); *B29D 2030/0044* (2013.01); *B29D 2030/482* (2013.01)
USPC ........................................ 156/406.2; 156/136

(58) Field of Classification Search
CPC .... B29D 30/18; B29D 30/2607; B29D 30/32; B29D 30/48; B29D 30/50; B29D 30/0016; B29D 2030/0044; B29D 2030/482; B29D 2030/487
USPC ........... 156/130.7, 136, 398, 403, 406.2, 131; 414/910, 806; 248/346.03
See application file for complete search history.

(56) References Cited

U.S. PATENT DOCUMENTS 2,917,087 A * 12/1959 Wyman .................... 140/92.2
3,548,898 A * 12/1970 Napolitano ................. 157/16
(Continued)

FOREIGN PATENT DOCUMENTS

DE   102005035725   3/2006
EP      1123198     4/2003
(Continued)

OTHER PUBLICATIONS

Machine generated English language translation of JP 2007-76233 (original document dated Mar. 2007).*

(Continued)

*Primary Examiner* — Martin Rogers
(74) *Attorney, Agent, or Firm* — David L King

(57) ABSTRACT

The present invention is directed to an apparatus for supporting an annular bead core-apex subassembly, the apparatus comprising a spacer disc for supporting the annular bead core-apex subassembly, and a clamping device comprising a supporting surface for supporting the spacer disc, as well as a plurality of clamping elements for selectively clamping the spacer disc to the supporting surface. The clamping elements are movable between an expanded position in which the spacer disc is clamped to the supporting surface, and a retracted position in which the spacer disc is released and can be lifted from the supporting surface. Moreover, the present invention is directed to a system comprising a respective apparatus for supporting an annular bead core-apex subassembly as well as the subassembly. Finally, the present invention is also directed to a method of transporting an annular bead core-apex subassembly.

7 Claims, 3 Drawing Sheets

(51) Int. Cl.
*B29D 30/00* (2006.01)
*B29D 30/26* (2006.01)

(56) References Cited

U.S. PATENT DOCUMENTS

| | | | |
|---|---|---|---|
| 4,832,651 A * | 5/1989 | Buck | 446/224 |
| 4,958,873 A * | 9/1990 | Akagawa | 294/93 |
| 5,632,836 A * | 5/1997 | Verschoor et al. | 156/111 |
| 7,501,033 B2 | 3/2009 | Hrycyk et al. | |
| 7,540,237 B2 * | 6/2009 | Kubin et al. | 101/44 |
| 7,600,993 B2 * | 10/2009 | Kataho et al. | 425/385 |
| 2004/0089400 A1 | 5/2004 | Vargo et al. | |
| 2008/0041248 A1 * | 2/2008 | Kuwabara et al. | 101/93.03 |
| 2009/0266474 A1 | 10/2009 | Matsuyama | |
| 2009/0293688 A1 * | 12/2009 | Nillies et al. | 82/129 |
| 2010/0043947 A1 * | 2/2010 | Janszen et al. | 156/110.1 |
| 2011/0146884 A1 | 6/2011 | Burg et al. | |
| 2011/0146888 A1 | 6/2011 | D'Sidocky et al. | |

FOREIGN PATENT DOCUMENTS

| | | | | |
|---|---|---|---|---|
| EP | 1165306 | 6/2003 | | |
| EP | 1683628 | 7/2006 | | |
| EP | 2036705 | 3/2009 | | |
| JP | 63-154334 | * 6/1988 | | B29D 30/48 |
| JP | 11-105155 | * 4/1999 | | B29D 30/48 |
| JP | 2007-76233 | * 3/2007 | | B29D 30/48 |
| JP | 2007-83403 | * 4/2007 | | B29D 30/48 |
| JP | 2007-160830 | * 6/2007 | | B29D 30/48 |
| JP | 2010-228343 | * 10/2010 | | B29D 30/48 |
| JP | 2010228343 | 10/2010 | | |
| WO | 9211131 | 7/1992 | | |
| WO | 2005118271 | 12/2005 | | |

OTHER PUBLICATIONS

Machine generated English language translation of JP 2007-160830 (original document dated Jun. 2007).*

Machine generated English language translation of JP 11-105155 (original document dated Apr. 1999).*

Machine generated English language translation of JP 2010-228343 (original document dated Oct. 2010).*

Machine generated English language translation of JP 2007-83403 (original document dated Apr. 2007).*

Machine generated English language translation of JP 63-154334 (original document dated Jun. 1988).*

* cited by examiner

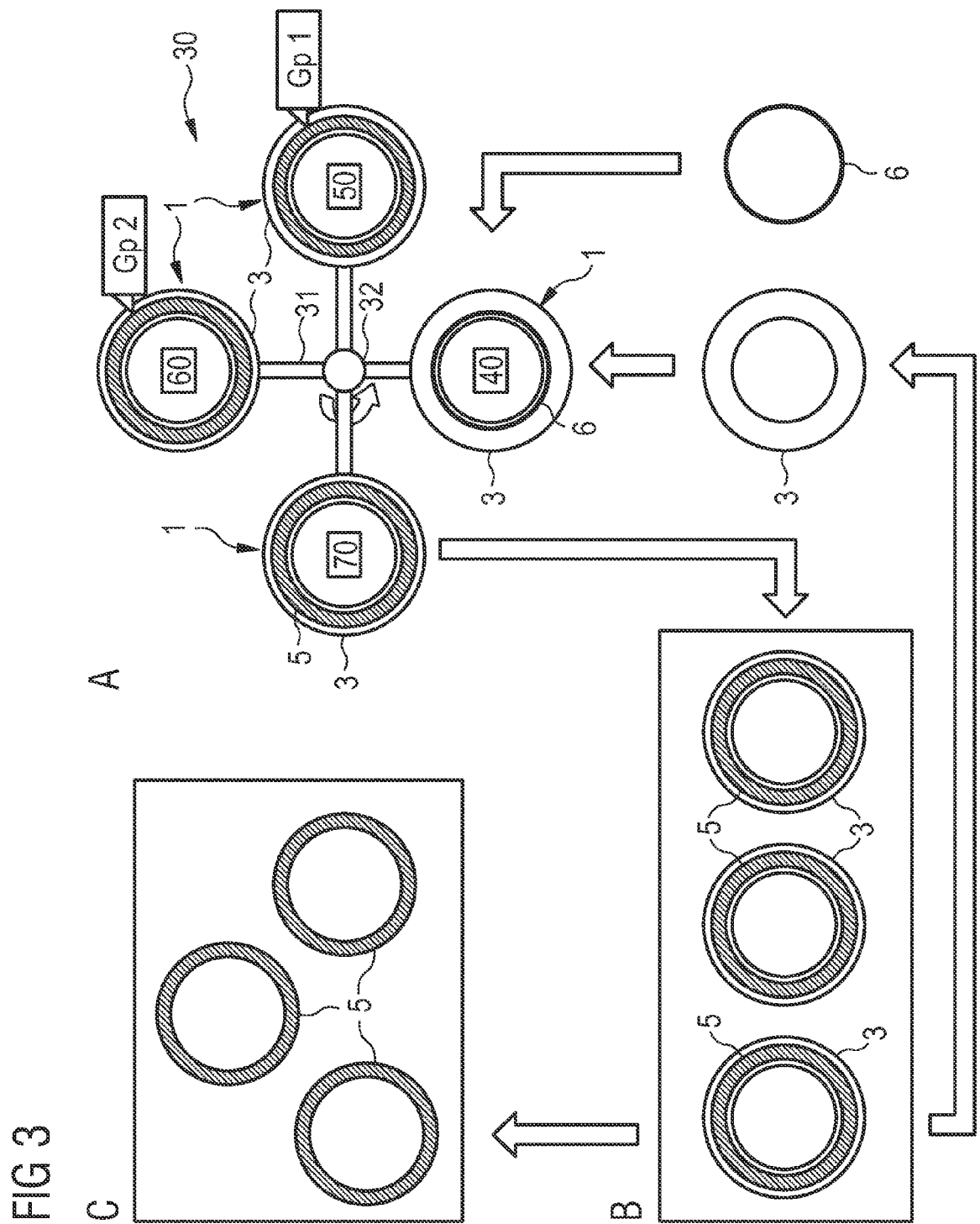

APPARATUS FOR SUPPORTING AND HOLDING A BEAD CORE-APEX SUBASSEMBLY AND METHOD OF PRODUCING AND TRANSPORTING THE BEAD CORE-APEX SUBASSEMBLY

FIELD OF THE INVENTION

The present invention relates to an apparatus for supporting, holding and/or transporting a bead core-apex subassembly. Such bead core-apex subassemblies may be used as a pre-assembled component in the manufacturing of a pneumatic tire.

Further, the present invention relates to a method of producing, processing and/or transporting a bead core-apex subassembly.

BACKGROUND OF THE INVENTION

US Patent Publication 2004/0089400 A1 describes a method and an apparatus for forming an annular elastomeric tire component. An elastomer is extruded annularly onto a support surface and a strip of the elastomer material is shaped to a predetermined profile between a shaping die and the support surface. The method may be used to form multilayered components.

EP 1 123 198 B1 describes a bead core-apex subassembly and a tire comprising such an assembly. The apex filler may be produced from a strip of elastomeric material which is extruded into a spiral by wrapping the extrusion around a rotating mandrel.

EP 1 165 306 B1 describes a combined bead loading and apex application system. A bead core-apex subassembly is manufactured, transferred onto a building drum and employed into a pneumatic tire.

US Patent Publication 2011/0146884 A1 describes the mixing of rubber compounds for use in tire manufacturing and a method of applying a blended rubber composition on a substrate such as a tire building drum.

US Patent Publication 2011/0146888 A1 describes again the mixing of rubber compounds for use in tire manufacturing. It describes also a method of forming a rubber article comprising two or more layers, the method comprising the steps of extruding a first rubber compound through a first extruder and a first gear pump, applying one or more first strips of rubber of the mixture directly onto a substrate, mixing a second rubber compound, and applying one or more second strips of rubber of the second mixture. The rubber article may be an apex of a pneumatic tire, the apex comprising two or more layers of rubber.

U.S. Pat. No. 7,501,033 B2 describes a method of manufacturing a bead core-apex-chipper subassembly for use in a pneumatic tire. A continuous elastomeric strip is extruded on a support surface as an apex strip, a chipper ply strip is attached to the apex strip, and the chipper and apex subassembly is attached to an annular bead core.

A challenge has been presented to provide an improved support or transport system for bead core-apex subassemblies or for their production. The support should allow a reliable handling of the bead core-apex subassembly without damaging the assembly.

A further challenge has been presented to provide a method of handling or transporting the system or bead core-apex subassemblies during and/or after manufacturing.

A further challenge has been presented to provide a standardized system and method for manufacturing, supporting or transporting bead core-apex subassemblies.

A further challenge has been presented to provide a method of manufacturing a pneumatic tire requiring fewer manufacturing steps in terms of incorporating a bead core and apex and, if appropriate, a flipper, in the pneumatic tire.

SUMMARY OF THE INVENTION

In an example of the invention, an apparatus for supporting an annular bead core-apex subassembly is provided, the apparatus comprising a spacer disc for supporting the annular bead core-apex subassembly, and a clamping device or chuck comprising a supporting surface for supporting the spacer disc, and a plurality of clamping elements for selectively clamping the spacer disc to the supporting surface, wherein the clamping elements are movable between an expanded position in which the spacer disc is clamped to the supporting surface, and a retracted position in which the spacer disc is released and can be lifted from the supporting surface.

In an example aspect of the present invention, the spacer disc comprises a central aperture defining an inner, essentially annular edge of the spacer disc and wherein, when the spacer disc is positioned on and clamped to the supporting surface, the clamping elements extend from the aperture to clamp at least the inner edge of the spacer disc.

In another example aspect of the present invention, the clamping elements are movable in parallel to and above the surface of the spacer disc such that, when the clamping elements are in the expanded position, the spacer disc is prevented from being lifted from the supporting surface, or wherein the clamping elements are pivotable onto the spacer disc such that, when the clamping elements are pivoted to the expanded position, the spacer disc is prevented from being lifted from the support surface.

In another example aspect of the present invention, the spacer disc comprises a central aperture defining an inner edge of the spacer disc, wherein the clamping elements are expandable from the central aperture and retractable to the aperture to selectively clamp or release the spacer disc.

In yet another example aspect of the present invention, the apparatus further comprises resilient elements forcing the clamping elements in the expanded position and allowing movement of the clamping elements to the retracted position upon application of a retraction force.

In still another example aspect of the present invention, the apparatus further comprises an actuator mechanically coupled to the clamping elements, wherein actuation by the actuator may move the clamping elements between the expanded and the retracted position.

In still another example aspect of the present invention, the clamping device comprises a sliding surface allowing a sliding movement of the clamping elements on that surface.

In still another example aspect of the present invention, the spacer disc comprises a central aperture defining an inner, essentially circular edge of the spacer disc and at least one of the clamping elements has an outer shoulder for clamping the inner edge of the spacer disc such that, when the clamping element is in the expanded position, the outer shoulder holds the inner edge of the spacer disc by a form fit.

In still another example aspect of the present invention, the spacer disc comprises a central aperture defining an inner, essentially circular edge of the spacer disc and wherein at least one of the clamping elements has an outer shoulder for clamping an inner edge of the annular bead core-apex subassembly such that, when the clamping element is in the expanded position, the outer shoulder holds the inner edge of the bead core-apex subassembly by a form fit.

In still another example aspect of the present invention, the spacer disc comprises a central aperture defining an inner, essentially annular edge of the spacer disc, and wherein at least one of the clamping elements has a radially outer shoulder for clamping an inner edge of the spacer disc such that, when the clamping element is in the expanded position, the outer shoulder holds the inner edge of the spacer disc by a form fit. Moreover, at least one of the clamping elements has a further radially outer shoulder for clamping an inner edge of the annular bead core-apex subassembly such that, when the clamping element is in the expanded position, the further outer shoulder holds the inner edge of the bead core-apex subassembly by a form fit.

In still another example aspect of the present invention, the spacer disc comprises a central aperture defining an inner, essentially annular edge of the spacer disc. Further, the clamping elements have a first segment for clamping the radially inner edge of the spacer disc and a second segment for clamping a radially inner edge of the bead core-apex assembly positioned on the spacer disc.

In yet another example aspect of the present invention, the second segment is detachably mounted to the first segment.

In still another example aspect of the present invention, the second segment is slidably mounted with respect to the first segment such that the distance between a radially outer edge of the first segment and a radially outer edge of the second segment is adjustable.

In still another example aspect of the present invention, the apparatus further comprises a central shaft movable perpendicularly to the supporting surface as well as transmission elements translating movement of the shaft into expansion or retraction of the movable segments.

In still another example aspect of the present invention, the apparatus further comprises sliding blocks supporting the clamping elements such that movement of the clamping elements between the expanded and the retracted position is at least partially supported or guided by the sliding blocks.

In still another example aspect of the present invention, the spacer disc may be essentially ring-shaped or may be an essentially annular plate. The supporting surface may have also an essentially annular shape.

According to a further example aspect of the invention, the invention is directed to system comprising an aforementioned apparatus and an annular bead core apex-subassembly or an annular bead supported by the spacer disc of said apparatus.

Further, the present invention may relate to a method of transporting a bead core-apex subassembly comprising the steps of providing or assembling an annular bead core-apex subassembly on a spacer disc in a manufacturing station; transporting the spacer disc together with the bead core-apex subassembly supported on the spacer disc from the manufacturing station to a cooling area or station; keeping the spacer disc together with the bead core-apex subassembly supported on the spacer disc in the cooling area until the bead core-apex subassembly has reached a desired temperature; and separating the bead core-apex subassembly from the spacer disc.

In an example aspect of the invention, the method comprises additionally one or more of the following steps: transporting the bead core-apex subassembly to a storage area or to a processing station for assembling the bead core-apex subassembly with further tire components; and transporting the spacer disc to the manufacturing station after separation from the bead core-apex subassembly.

In another example aspect of the present invention, the step of providing an annular bead core-apex comprises one or more of the following sub-steps: placing an annular bead core on a spacer disc in a loading station; transporting the spacer disc supporting the annular bead core to a first rubber composition extruding station; extruding a first rubber composition onto the spacer disc; transporting the spacer disc supporting the annular bead core and the first rubber composition to one or more further rubber composition extruding stations; extruding one or more further rubber compositions onto the spacer disc to form a bead core-apex subassembly; and transporting the spacer disc to an unloading station.

In another example aspect of the present invention, the spacer disc may be clamped to a supporting surface of a clamping device, for instance at least in the manufacturing station, and transported through or in the manufacturing station clamped to the supporting surface.

All features of the above described aspects of the invention may be combined or replaced with one another.

DEFINITIONS

"Bead Core" generally means one or more annular tensile members that are associated with holding the tire to the rim. Often, the bead core is made from one or more steel wires wound to the bead core. The bead core may have various cross-sections such as round or hexagonal.

"Apex" or the equivalent term "bead filler apex" means an elastomeric filler structure which is located radially above the bead core and between the plies in a pneumatic tire.

"Flipper" refers to a reinforcing fabric for placing about the bead core for strength and to tie the bead core in the tire body. It may be a fabric or a reinforced rubber ply.

BRIEF DESCRIPTION OF THE DRAWINGS

In the following, we briefly describe the figures according to the embodiments of the present invention. Further details are given in the detailed description of the embodiments. The Figures have the purpose of illustrating the invention and should not be understood in a limiting sense.

FIG. 3 shows a scheme of producing and transporting a bead core-apex subassembly.

DETAILED DESCRIPTION OF THE DRAWINGS

Figure 1:
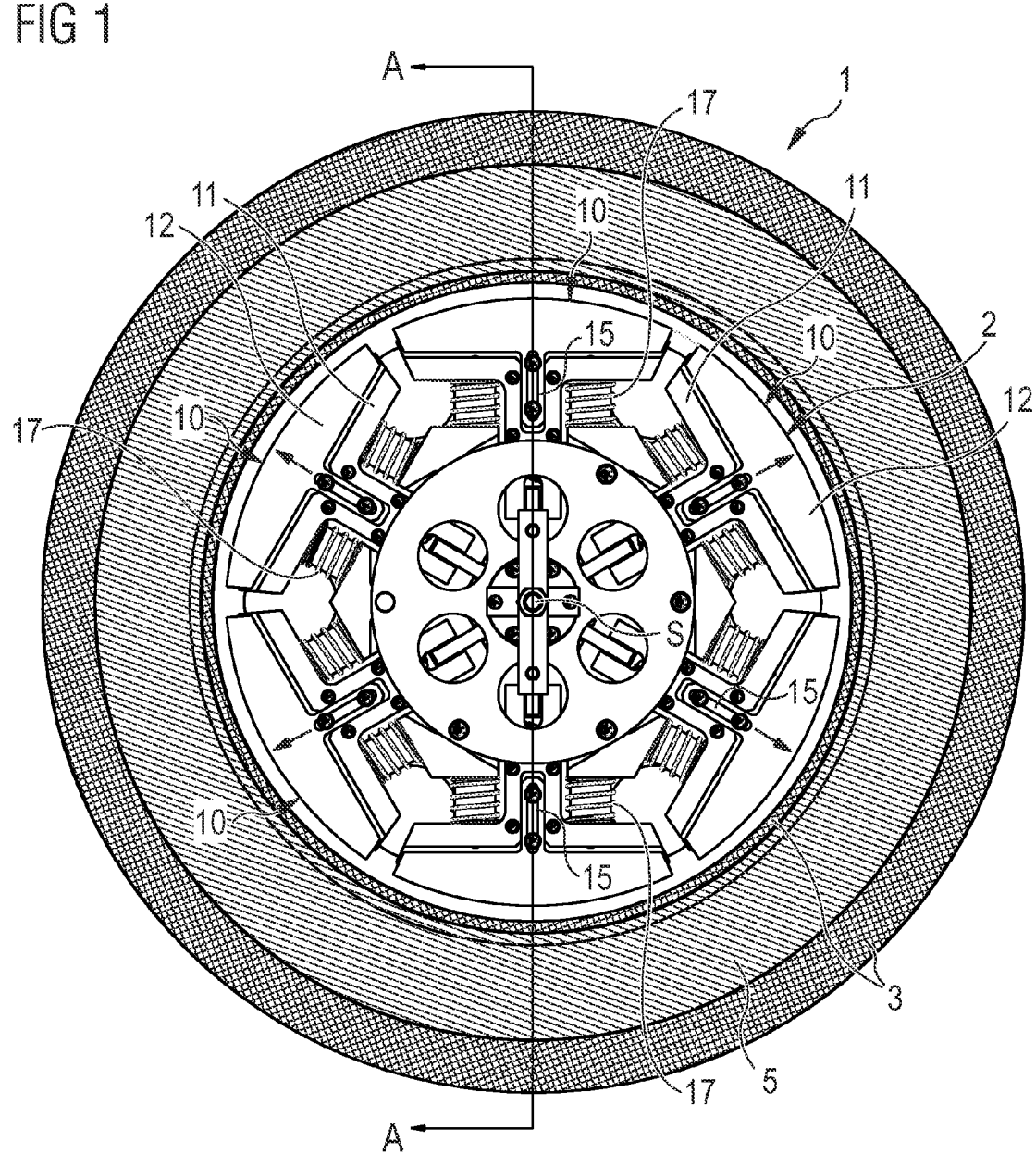
FIG. 1 shows an apparatus for supporting a bead core-apex subassembly according to an example of the invention.
Figure 2:
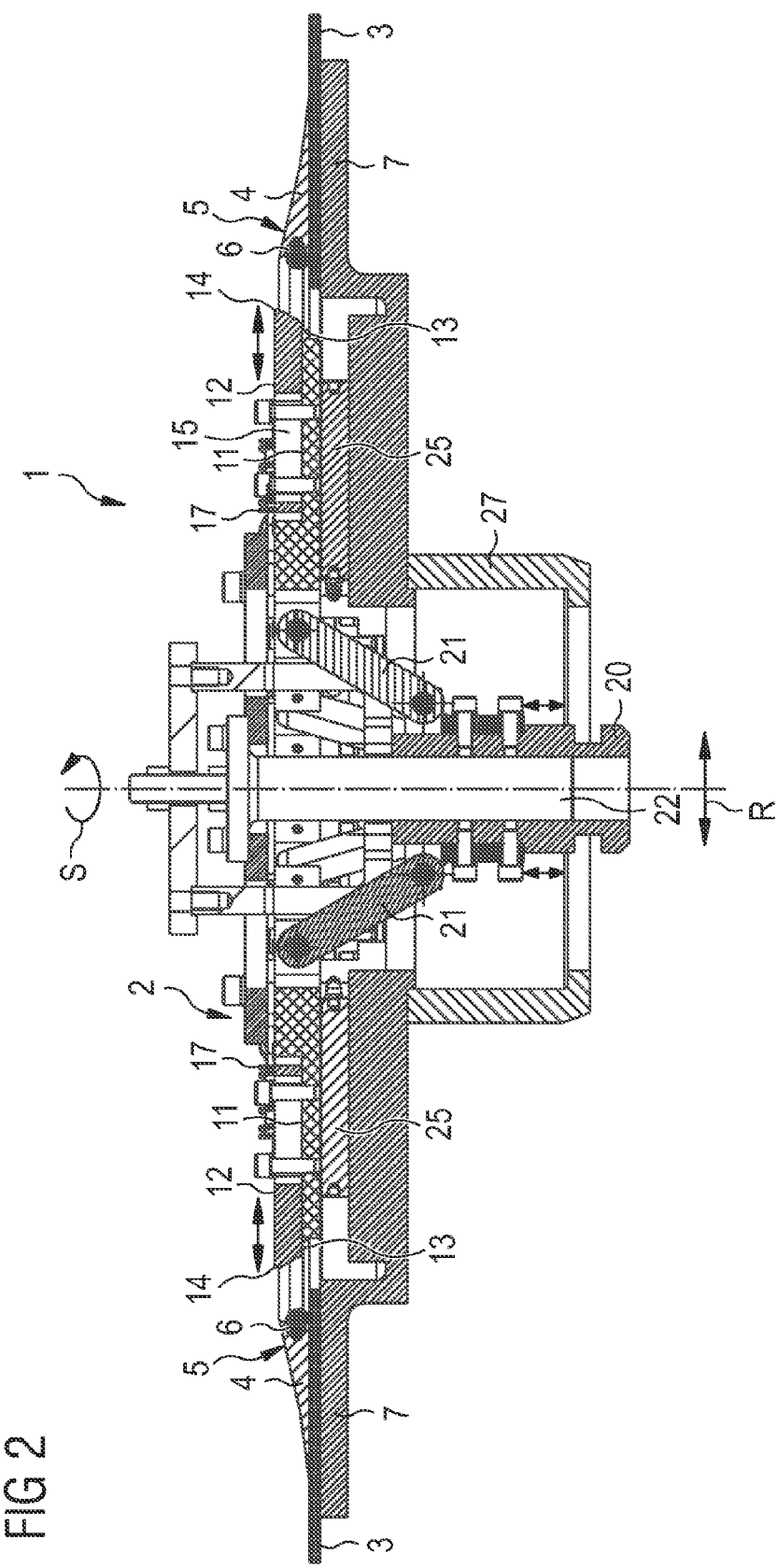
FIG. 2 shows the cross-section A-A of the apparatus depicted in FIG. 1.

FIG. 1 shows a top view of an apparatus 1 according to an example of the invention, whereas FIG. 2 shows the cross-section A-A of the same apparatus. In the following reference is made to both of these Figures since not all details are visible in each single Figure.

The apparatus 1 comprises a spacer disc 3 which may support an annular bead core-apex subassembly 5 as for instance used as a pre-assembled component in the manufacturing of a pneumatic tire (not shown). In particular, the spacer disc 3 may be a ring-shaped disc or annular supporting plate. However, other shapes may be used as well for supporting the subassembly 5. In particular, the spacer disc 3 has a (central) aperture having preferably an essentially circular shape. However, the term circular shall not exclude polygonal shapes. The depicted annular spacer disc 3 may have an inner diameter which is smaller than an inner diameter of the annular bead core-apex subassembly 5 to be supported, and may have an outer diameter exceeding the diameter of the bead core-apex subassembly 5 to be supported. In general, the surface of the spacer disc 3 may be essentially flat. Spacer discs 3 may be made of metal, as e.g. of steel or aluminum.

They may have coatings, in particular anti-stick coatings, as e.g. Teflon™ or plastic coatings, and/or textures for allowing an easier removal of bead core-apex subassemblies 5 from the spacer discs 3. Further, a spacer disc 3 may have or consist of a plurality of segments. Such segments may be movable, rotatable or tiltable with regard to one another to further improve the removability of a subassembly 5.

As further depicted in FIG. 1, the apparatus 1 may comprise a clamping device 2 having a supporting surface 7 for carrying the spacer disc 3 and having a plurality of expandable elements 10 which may be movable essentially in a radial direction with respect to a center axis S of the apparatus 1. The center axis S may be essentially perpendicular to the supporting surface 7 and the spacer disc 3 supported thereon. The expandable elements 10 or clamping elements 10 may be pushed in the direction of the arrows shown in FIG. 1 to clamp the spacer disc 3 on a supporting surface 7 of the clamping device 2 which is shown in the cross-section according to FIG. 2. Clamping the spacer disc 3 with the expandable elements 10 to the supporting surface 7 results in a defined position of the spacer disc 3 with respect to its support. Preferably, as e.g. shown in the example, each clamping element 10 may comprise at least two segments 11, 12, wherein the first segment 11 is adapted to clamp the spacer disc 3 and wherein the second segment 12 is adapted to clamp the annular bead core-apex subassembly 5 or an annular bead 6 thereof. For that purpose each segment 11, 12 may have a shoulder or protrusion 13, 14 such that the segments 11, 12 block the spacer disc 3 and the bead 6 or bead core-apex subassembly 5 with a form fit. The clamping elements 10 may be movable in a horizontal direction or in other words perpendicular to the central axis S of the spacer disc 3 when supported on the supporting surface 7. However, alternatively, the clamping elements 10 could also be moved from a retracted position to an expanded position by a tilting or pivoting movement (not shown). As further shown, the second segment 12 may be adjustable relative to the first segment 11. For example, such an adjustment may be allowed by a long hole 15 arranged in one of both segments 11, 12 and corresponding screws or bolts connecting both segments 11, 12 or by a sliding rail (not shown). By providing an adjustment possibility between the radially outer edges of the first clamping segment 11 and the second clamping segment 12, the apparatus 1 may be used for instance for different annular bead core-apex subassemblies 5, e.g. having different (inner) diameters or different thicknesses. Further, the clamping elements 10 or the second and or the first segments 11, 12 may be removably mounted such that they may be replaced for using different spacer discs 3 or producing different bead core-apex subassemblies 5.

Optionally, the clamping elements 10 are resiliently mounted to the apparatus 1 such that spring elements 17 press or force the clamping elements 10 into the expanded position. Then, the clamping elements 10 hold the spacer disc 3 and/or the bead core-apex subassembly 5 in the absence of retraction forces. In order to release the annular spacer disc 3 and/or the bead core-apex subassembly 5, the elements 10 or their segments 11, 12 must be actively retracted. In general, it is also possible that both segments 11, 12 may be moved independently between a retracted and expanded clamping position.

The cross-section of FIG. 2 depicts an exemplary mechanism for moving the expandable elements 10 from the expanded clamping position to a retracted position. In particular, a shaft or actuator 20 movable essentially in parallel to the central axis S, or in other words perpendicular to the supporting surface 7 or the plane of the spacer disc 3, may drive via transmission elements 21 the expanding motion of the clamping elements 10. In particular, the transmission elements 21 may comprise levers or rods 21 which are pivotally coupled to the shaft 20 on one of their ends and pivotally coupled to a clamping element 10 at one of their other ends. For example, the shaft 20 may be a hollow shaft or sleeve sliding on an axis 22 fixedly mounted or connected to the supporting surface 7. As further depicted in FIG. 2, the expandable elements 10, or in particular, the first segments 11 may be at least partially guided on sliding blocks 25. The shaft 20 could be moved or driven by a drive system as e.g. an electric or hydraulic motor. Further, the apparatus 1 could be mounted to a table (not shown) having a holder for carrying or supporting the apparatus 1 or clamping device 2, for example for receiving a base portion 27 of the clamping device 2 in an aperture. Base portion 27 is preferably fixed to the supporting surface 7 of the clamping device 2. Driving means for actuating the movement of the clamping elements 10 or segments 11, 12 could be provided in such a table. Further, a corresponding table might be movable in one, two or three dimensions and/or might be rotatable, e.g. about a vertical axis, in order to allow rotation of the supporting surface 7, the spacer disc 3 and thus of the bead core-apex subassembly 5 about the central axis S. Alternatively, the apparatus 1 could be rotatably mounted to such a table.

If the spacer disc 3 has an essentially annular shape, it may preferably have an inner diameter of between about 30 cm and about 60 cm, the outer diameter is preferably between about 35 cm and about 100 cm. If the spacer disc 3 has a circular cut-out or aperture defining an annular inner edge, the latter may have the same inner diameter as mentioned above. The spacer disc's 3 thickness is preferably between about 0.1 cm and about 3 cm.

FIG. 2 shows also a cross-section of an exemplary bead core-apex subassembly 5 comprising a bead portion 6 and an apex portion 4. The apex portion 4 may have a substantially triangular cross-section and the bead 6 may be positioned on a radially inner side of the bead core-apex subassembly 5. Further optional details of the manufacturing or the composition of bead-core apex subassemblies 5 are described below. The apex portion 4 is shown for the sake of simplicity as one piece. However, the apex portion 4 may comprise multiple portions, for instance, made of different rubber components.

FIG. 3 shows a scheme of manufacturing and transporting bead core-apex subassemblies 5. For the sake of a better intelligibility equal reference numerals are used for the elements already described in FIGS. 1 and 2.

The scheme of FIG. 3 comprises three main stations A, B and C, wherein the bead core-apex subassembly 5 is manufactured in station A and is deposited afterwards in cooling station B and transferred subsequently to station C which may be either a storage station or a further processing station, e.g. for assembling tires or tire components.

In particular, annular spacer discs 3 and bead cores 6 may be provided to the manufacturing station A which produces the bead core-apex subassembly 5. After production, the bead core-apex subassembly 5 is transported together with the annular spacer discs 3 to cooling area or station B. This station may accommodate a plurality of such spacer discs 3 together with subassemblies 5 supported thereon. Preferably, the cooling station B is conditioned and has temperatures of between 15° C. and 30° C., and preferably between 20° C. and 25° C. In particular, the cooling station B may comprise air blowers. Moreover, a subassembly 5 may rest in the cooling station B until it has reached the temperature of the conditioned cooling station B. Preferably, the subassembly 5 may be kept in the cooling station B for between about 5 and 30 minutes.

In a next step, the bead core-apex subassemblies 5 may be removed or lifted from the spacer disc 3. This step may be carried out manually or automated via an unloading device. The bead core-apex subassemblies 5 may then be transported to a storage facility C or a further processing station C for further building or assembling of tires or tire components.

Preferably, unoccupied spacer discs 3 are transported back to the manufacturing station A to be equipped again with bead cores 6.

As also shown in FIG. 3, the manufacturing station A may comprise a rotatable supporting rack 30 having at least two, preferably four, support arms 31 extending from a central column 32. Each support arm 31 carries preferably an apparatus 1 according to an embodiment of the present invention. Further, the annular supporting surface 7 or the clamping device 2 of each apparatus 1 may be rotatable around its central axis S.

In another aspect, the first, second, third and fourth arms 31 may be arranged about the center column 32 at an angular distance of substantially 90 degrees, wherein the first, second, third and fourth arms may have a substantially equal length.

In general, the number of arms may correspond to the number of stations within the manufacturing station A. The angular distance between two adjacent arms may e.g. be essentially given by 360 degrees divided by the numbers of arms or stations within the manufacturing station A.

The manufacturing station A may comprise a loading station 40. The loading station 40 may comprise a loading device configured for transferring an annular bead core 6 and an empty spacer disc 3 to a supporting surface 7 of an apparatus 1 provided to or present in the loading station 40.

Upon loading, the spacer disc 3 may be clamped to the supporting surface 7 of the apparatus 1. Then either the apparatus 1 together with disc 3 and bead core 6 or only the spacer disc 3 with the bead core 6 are moved to a first extruding or pumping station 50.

As extrusion or pumping device, the device as described in EP 1 418 043 A2, may be used. Alternatively, a device as described in EP 1 749 648 A2 may be used.

The pumping or extrusion station 50 may comprise for instance a gear pump Gp 1.

Further, a nozzle in fluid communication with a pumping or extrusion device may be provided. The supporting surface 7 and the spacer disc 3 clamped thereto may be rotated about the central axis S and a first rubber compound may be discharged through the nozzle onto the rotating annular spacer disc 3 to form an apex from the discharged rubber compound. The nozzle may further comprise a tongue, the tongue compressing the rubber compound against at least one of the rotating spacer disc 3 and the bead core 6 with a flipper wrapped about the bead core 6. Preferably, the rotatable disc 3 is rotated by substantially 360 degrees during discharge of rubber compound or rubber composition.

Alternatively, the rubber compound could be discharged substantially in the shape of a strip onto the rotating spacer disc 3 and the nozzle could be moved radially relative to the annular bead core 6 located on the supporting surface 7 while discharging the strip rubber compound. An apex may be formed from one or more rubber strips discharged through one or more nozzles onto the rotating spacer disc 3.

In general, the spacer disc 3 and/or the supporting surface 7 may rotate in a substantially horizontal plane wherein the axis of rotation (or central axis) is perpendicular to the spacer disc 3 and/or the supporting surface 7.

In a further optional step, the apparatus 1 may be moved or rotated to a second extrusion or pumping station 60 in which a second rubber compound or composition may be applied to the bead core 6 or to the annular bead core-apex already produced in station 50. For example, a gear pump Gp 2 may be used for application of the rubber compound or composition.

Alternatively, extrusion or pumping is carried out only in one station 50, 60. In particular, it is possible that at least two extrusion or pumping devices are arranged in one station 40, 50. Thus, two rubber compositions could be applied subsequently or at the same time.

The unloading station 70, being preferably the last station of the manufacturing station A, may comprise an unloading device configured for lifting the spacer disc 3 from the supporting surface 7 of the clamping device 2. Then the spacer disc 3 may be further transported to the cooling station B.

The manufacturing station A has been described with reference to a rotatable rack 30 having arms 31 carrying each an apparatus 1 or clamping device 2. However, it is emphasized that stations 40, 50, 60 and 70 may also be arranged in line. For example, transport between these stations could be carried out by a conveyor system or conveyor belt. As a further alternative, the pumping or extrusion devices may be moved over apparatuses 1. However, this might lead to delays in the manufacturing process. In general, it is also possible that only the spacer discs 3 carrying the bead cores 6 or bead core-apex subassemblies 5 are moved between stations 40, 50, 60 and 70.

In general, a bead core-apex subassembly 5 may comprise an annular bead core 6, a flipper and an apex wherein the flipper may be wrapped about the bead core such that it enclose the bead core and wherein the apex is in contact with the flipper and comprises at least one segment comprising a rubber composition. Alternatively, the flipper may comprise at least two different segments. A second segment may have a composition different from the composition of the first segment.

The bead 6 may be a conventional bead core 6 comprising for instance one or more steel wires. Further, the flipper may be a conventional flipper as used in tire manufacturing. It may e.g. be a fabric or a reinforced rubber ply. Apexes may have substantially triangular shapes and may for instance extend from the flipper to an apex tip. If two segments are provided as described as an option above, at least one of the cross-section of the first segment and the cross-section of the second segment may have a substantially triangular shape. Preferably, only the first segment of the apex is in contact with the flipper. In general, different segments of the flipper may comprise rubber compositions with different shore A hardness, wherein the shore A hardness of the first rubber composition may differ by at least 3, alternatively by at least 5 or at least 10, from the shore A hardness of the second rubber composition and/or wherein the shore A hardness of the first segment is larger, preferably by at least 3 larger, than the shore A hardness of the second segment. Further, it is possible that the flipper completely encloses the bead core.

During manufacturing, an annular bead core 6 may be provided and the flipper may be wrapped about the annular bead core 6 such that the flipper encloses the bead core. In a further optional step the bead core 6 with the flipper wrapped about the bead core 6 may be positioned on the spacer disc 3 described above in loading station 40.

The invention has been described with reference to best modes of carrying out the invention. Obviously, modifications and alterations will occur to others upon a reading and understanding of this specification. It is intended to include all such modifications and alterations in so far as they come within the scope of the appended claims or the equivalents thereof.

In any case the above described examples shall not be understood in a limiting sense. In particular, the features of the above examples may also be replaced or combined with one another.

The invention claimed is:

1. A system comprising:
an annular bead core apex-subassembly for making a tire;
an apparatus for supporting the annular bead core-apex subassembly, the apparatus comprising:
a center axis S;
a spacer disc for supporting the annular bead core-apex subassembly, the spacer disc having planar annular face surfaces for supporting the subassembly between an inner diameter of the spacer disc and an outer diameter of the spacer disc, the inner diameter of the spacer disc being smaller than an inner diameter of the subassembly and the outer diameter of the spacer disc being larger than an outer diameter of the subassembly;
a clamping device comprising an annular supporting surface for carrying and supporting the spacer disc along one of said planar annular face surfaces of the spacer disc, and a plurality of clamping elements for selectively clamping the spacer disc to the annular supporting surface of the clamping device, the clamping elements being movable relative to the center axis S between an expanded position in which the spacer disc is clamped to the annular supporting surface of the clamping device, and a retracted position in which the spacer disc is released and can be lifted from the annular supporting surface of the clamping device, wherein the clamping elements are movable in parallel to and above the planar annular face surfaces of the spacer disc such that, when the clamping elements are in the expanded position, the spacer disc is held on the annular supporting surface of the clamping device;
wherein the spacer disc comprises a central aperture defining an inner, annular edge of the spacer disc at the inner diameter of the spacer disc; and
wherein the plurality of clamping elements has each clamping element having an inner first segment with a radially outer shoulder for clamping the inner, annular edge of the spacer disc such that, when the clamping elements are in the expanded position, the outer shoulder of the inner first segment of each of the clamping elements positions the spacer disc at a defined position with respect to the annular support surface of the clamping device and holds the inner, annular edge of the spacer disc by a form fit;
wherein the each clamping element has an outer second segment having a further radially outer shoulder for clamping an inner edge of the annular bead core-apex subassembly such that, when the clamping elements are in the expanded position, the further radially outer shoulder of each of the outer second segments of each of the clamping elements positions the bead core at a defined position on the spacer disc and holds the inner edge of the bead core-apex subassembly by a form fit; and
wherein each clamping element has its outer second segment slidably mounted with respective to its inner first segment such that the distance between the radially outer shoulder of each inner first segment is adjustable with respect to the further radially outer shoulder of its associated outer second segment.

2. The system according to claim 1, further comprising:
resilient elements forcing the clamping elements in the expanded position and allowing movement of the clamping elements to the retracted position upon application of a retraction force.

3. The system according to claim 1, further comprising:
an actuator mechanically coupled to the clamping elements, wherein actuation by the actuator may move the clamping elements between the expanded and the retracted position.

4. The system according to claim 1,
wherein the clamping device comprises a sliding surface arranged to allow a sliding movement of the clamping elements on the sliding surface.

5. The system according to claim 1, wherein the outer second segment of each clamping element is detachable from its associated inner first segment.

6. The system according to claim 1, further comprising:
a central shaft movable perpendicularly to the annular supporting surface of the clamping device, and
transmission elements translating movement of the shaft into expansion or retraction of the movable clamping elements.

7. The system according to claim 1, further comprising:
sliding blocks supporting the clamping elements such that movement of the clamping elements between the expanded and the retracted position is at least partially supported or guided by the sliding blocks.

* * * * *